United States Patent [19]

Gustafson

[11] 4,420,280
[45] Dec. 13, 1983

[54] TOOL BLOCK

[75] Inventor: Manfred Gustafson, Fagersta, Sweden

[73] Assignee: Seco Tools Aktiebolag, Fagersta, Sweden

[21] Appl. No.: 293,216

[22] PCT Filed: Mar. 27, 1981

[86] PCT No.: PCT/SE81/00094
§ 371 Date: Aug. 11, 1981
§ 102(e) Date: Aug. 11, 1981

[87] PCT Pub. No.: WO81/03635
PCT Pub. Date: Dec. 24, 1981

[30] Foreign Application Priority Data

Apr. 3, 1980 [SE] Sweden ............................ 8002581

[51] Int. Cl.³ .............................................. B26D 1/00
[52] U.S. Cl. ........................................ 407/109; 407/40; 407/48; 407/98
[58] Field of Search ............... 407/40, 48, 50, 76, 407/98, 104, 109, 111; 82/36 R; 29/26 R, 568

[56] References Cited

U.S. PATENT DOCUMENTS 3,838,500 10/1974 Wirfelt.
3,981,607 9/1976 Jorgensen .......................... 407/98
4,321,846 3/1982 Neamtu ............................ 407/109
4,364,693 12/1982 Lindsay ............................ 407/48

FOREIGN PATENT DOCUMENTS 2347136 12/1977 France ............................. 407/111
1510649 5/1978 United Kingdom.

Primary Examiner—W. D. Bray
Attorney, Agent, or Firm—Burns, Doane, Swecker & Mathis

[57] ABSTRACT

A tool block is provided with a cutting insert holder (12), provided with a cutting insert (14), and a clamping device comprising a pivotally arranged lever (20), one end of which acts on the cutting insert holder (12) while the other end of which cooperates with a spring loaded device (21).

10 Claims, 1 Drawing Figure

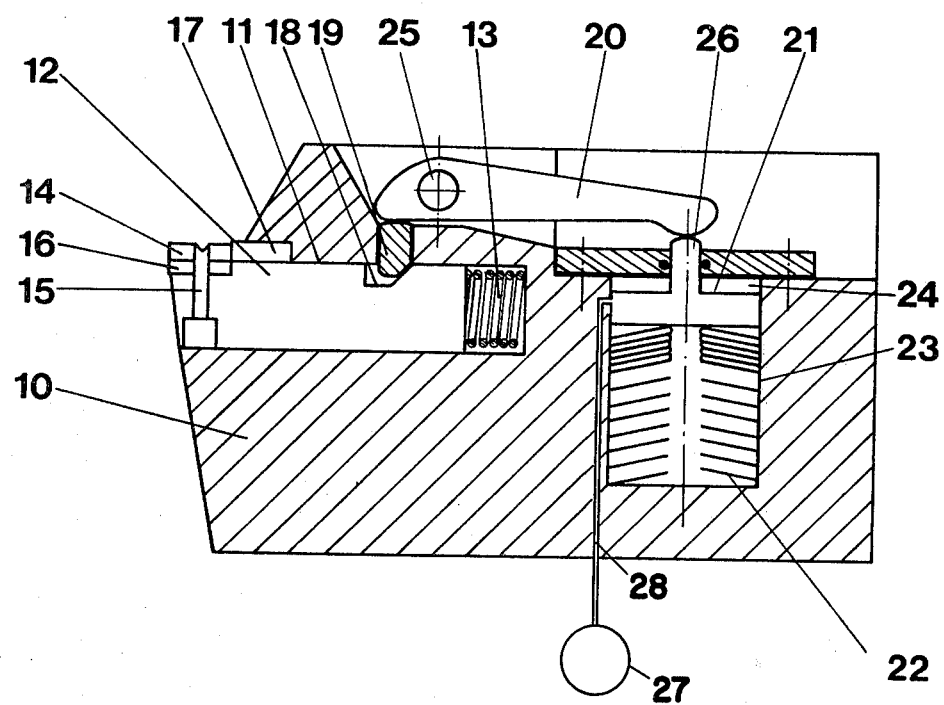

TOOL BLOCK

BACKGROUND OF THE INVENTION

This invention relates to a tool block with a cutting insert holder positioned in the tool block, which holder is provided with a cutting insert.

An object of this invention is to design the tool block in such a way that cutting insert exchange and indexing of cutting inserts are considerably simplified.

SUMMARY OF THE INVENTION

In accordance with the present invention, an insert holder is movable on a tool holder between insert clamping and insert non-clamping positions. A lever is biased in one direction to forcefully urge the holder toward a clamping position. The bias on the lever can be released to enable the holder to be moved to the insert non-clamping position, preferably by means of a spring which pushes against the holder.

BRIEF DESCRIPTION OF THE DRAWING

A preferred embodiment of the invention shall be more closely described in connection to the accompanying drawing which is a sectional view taken through a tool block, depicting an insert holder in an insert-clamping position.

DETAILED DESCRIPTION OF A PREFERRED EMBODIMENT OF THE INVENTION

The tool block disclosed in the drawing comprises a longish holding body 10 in which is made a cavity 11 oriented in the longitudinal direction of the holding body 10, in which cavity a cutting insert holder 12 is movably arranged against the action of a spring 13. A cutting insert 14 provided with an aperture is positioned on a locking pin 15 mounted on and projecting from the insert receiving-site of the cutting insert holder 12. The bottom support surface for the cutting insert 14 is, as usual, formed by a separate support plate 16 of the same form as the cutting insert, while the back support for the cutting insert is formed by a stop 17 positioned on the stationary part of the tool block. The support plate 16 is received in a recess of the insert holder 12 and is secured to the latter by the pin 15 which extends through the support plate 16 and the cutting insert 14 such that the insert holder 12, the pin 15, the insert 14, and the support plate 16 are movable as a unit relative to the recess 11.

The cutting insert holder 12 is formed with a recess 18 in which a slide 19 arranged substantially parallel with the locking pin 15 shall be positioned. The recess 18 in section has the form of a parallel trapezoid, the beveled surface of which is the stop surface for the slide 19. In this connection the stop surface of the slide 19 is also beveled in order better to be able to cooperate with the beveled surface of the recess 18. For influence upon the slide there is arranged a lever 20, one end of which acts upon the slide 19, while the other end of which cooperates with a plunger 21 of a pressure-cylinder 24, which is positioned in a cavity 23 oriented substantially parallel with the locking pin 15 in the tool block. In this connection the under-side of the plunger 21 is under the biasing influence of a spring device 22.

The lever 20 is pivotally positioned on an axis 25, which is fixed in the tool block, which axis is perpendicularly directed to the centre line of the cylinder 24. The two ends of the lever 20 are unattachedly resting against the slide 19 respectively a pin 26 projecting from the plunger 21.

When loosening the cutting insert 14 a pressure medium, for instance air, is from a suitable source (e.g., a conventional pump 27) forced into the cylinder on the upper side of the plunger 21, via a passage 28 whereby the plunger 21 retracted downwards is against the action of the spring 22. In this connection the pressure of the lever 20 on the slide 19 is reduced, whereby the spring 13 can force out the cutting insert holder 12. In this connection there is formed a gap between the back edge of the cutting insert 14 and the support 17, which is enough in order to be able to remove the cutting insert 14 from its insert receiving site.

After the exchange or indexing of the cutting insert the pressure in the cylinder 24 is removed, whereby the plunger 21 is forced upwards by the action of the spring 22. In this connection the pin 26 of the plunger 21 influences the lever 20 so that it pivots around the axis 25 and forces the slide 19 into the recess 18 of the cutting insert holder 12. When the slide 19 is forced into the recess 18 the cutting insert holder 12 against the action of the spring 13 will move backwards until the cutting insert 14 is resting against the support 17, the cutting insert being clamped by means of the locking pin 15 fixed to the cutting insert holder and the support 17.

The invention is not limited to the disclosed embodiment but can be varied within the scope of the filed claims.

Thus, as a pressure medium instead of air oil or other liquideous or gaseous media can be used. Furthermore, the lever can be fixed to the slide and/or the plunger by mechanical joints or in another suitable way.

Moreover, the invention is neither limited to a device for fastening cutting inserts provided with apertures but the invention idea is also applicable to cutting inserts without apertures. In the latter case there cannot be a pin centrally projecting from the insert receiving site for fastening the cutting insert but this must be done with other arrangements, for instance an edge projecting from the insert receiving site and positioned in front of the insert.

I claim:

1. In combination:
   a tool block having a stop surface,
   a cutting insert holder movable on said tool block between clamping and non-clamping positions, said holder including means for mounting a cutting insert such that the insert is clamped against said stop surface when said tool holder is in said clamping position, and
   holder moving means for moving said insert holder into said clamping position and comprising:
      a lever having first and second portions and being rotatably mounted on said tool block intermediate said first and second portions,
      holder-engaging means at said first portion of said lever for engaging said holder and moving said holder to said clamping position in response to rotation of said lever in a first direction,
      biasing means arranged on said tool block for forcefully engaging said second portion of said lever to rotate said lever in said first direction so that said holder-engaging means moves said holder to said clamping position, and
      retracting means for retracting said biasing means to enable said lever to be rotated in a second direction opposite said first direction such that said holder is movable to said non-clamping position.

2. A combination according to claim 1, wherein said tool block includes a recess, said tool holder being movably mounted in said recess and being movable inwardly within said recess to said clamping position and outwardly relative to said recess to said non-clamping position.

3. A combination according to claim 1, including first spring means for urging said tool holder toward said non-clamping position, said first spring means yieldably permitting said tool holder to be moved to said clamping position by said holder moving means.

4. A combination according to claim 3, wherein said biasing means comprises a plunger and second spring means for urging said plunger against said second portion of said lever.

5. A combination according to claim 4, wherein said plunger includes a projecting pin which engages said second portion of said lever.

6. A combination according to claim 4, wherein said tool block includes a cylindrical cavity, said plunger and said second spring means being disposed in said cavity.

7. A combination according to claim 1, wherein said retracting means comprises means for conducting pressurized fluid into said cavity on a side of said plunger opposite said second spring means to push said plunger in a direction away from said second portion of said lever against the urgings of said second spring means.

8. A combination according to claim 1, wherein said tool holder includes an opening having a first surface, said holder-engaging means comprising a slide pin which is separate from said lever and includes a second surface, said slide pin being slidably disposed in said opening and arranged to be forcefully engaged by said first portion of said lever in response to rotation of said lever in said first direction such that said second surface pushes against said first surface to move said tool holder to said clamping position.

9. A combination according to claim 8, wherein said first and second surfaces each comprise a beveled surface.

10. A combination according to claim 1, wherein said insert holder includes a projecting pin for entering an insert aperture to mount the insert to said tool holder.

* * * * *